(12) United States Patent
Qian

(10) Patent No.: US 9,936,173 B2
(45) Date of Patent: Apr. 3, 2018

(54) METHOD FOR PROCESSING IMAGE AND APPARATUS THEREOF

(71) Applicants: Beijing Lenovo Software Ltd., Beijing (CN); Lenovo (Beijing) Co., Ltd., Beijing (CN)

(72) Inventor: Diandian Qian, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 28 days.

(21) Appl. No.: 14/229,314

(22) Filed: Mar. 28, 2014

(65) Prior Publication Data
US 2015/0015733 A1 Jan. 15, 2015

(30) Foreign Application Priority Data
Jul. 12, 2013 (CN) .......................... 2013 1 0293601

(51) Int. Cl.
*H04N 5/232* (2006.01)
*H04N 9/07* (2006.01)
(52) U.S. Cl.
CPC ........... *H04N 9/07* (2013.01); *H04N 5/23245* (2013.01)
(58) Field of Classification Search
CPC .............................. H04N 9/07; H04N 5/23245
See application file for complete search history.

(56) References Cited

U.S. PATENT DOCUMENTS

| 8,670,046 | B2 | 3/2014 | Ohba et al. | |
|---|---|---|---|---|
| 2009/0041363 | A1* | 2/2009 | Choi | H04N 5/772 382/233 |
| 2009/0110330 | A1 | 4/2009 | Yen | |
| 2009/0201314 | A1 | 8/2009 | Tanaka et al. | |
| 2012/0281119 | A1 | 11/2012 | Ohba et al. | |
| 2014/0187239 | A1* | 7/2014 | Friend | H04L 69/08 455/426.1 |

FOREIGN PATENT DOCUMENTS

| CN | 101420504 A | 4/2009 |
|---|---|---|
| CN | 102668585 A | 9/2012 |

OTHER PUBLICATIONS

First Chinese Office Action regarding Application No. 201310293601.1 dated Dec. 28, 2016. English translation provided by Unitalen Attorneys at Law.

* cited by examiner

*Primary Examiner* — Twyler Haskins
*Assistant Examiner* — Angel L Garces-Rivera
(74) *Attorney, Agent, or Firm* — Harness, Dickey & Pierce, P.L.C.

(57) ABSTRACT

The present disclosure discloses a method for processing an image and an apparatus thereof, applicable to an electronic device including an image acquisition unit corresponding to an image acquisition area, wherein the method includes: generating a first image and a second image according to an object to be acquired in the image acquisition area at a first instance of time, wherein both the first image and the second image are images corresponding to the object to be acquired, and the amount of data of the first image is larger than the amount of data of the second image; and storing the first image and the second image and setting the second image as an associated image of the first image, to thereby improve the convenience and efficiency of processing the generated image in the electronic device.

12 Claims, 3 Drawing Sheets

--- images are taken respectively in a first imaging mode and a second imaging mode for an object to be acquired in the image acquisition area at a first instance of time to obtain a first image corresponding to the first imaging mode and a second image corresponding to the second imaging mode, where the amount of data of the first image is larger than the amount of data of the second image ⟶ 201 the first image and the second image are stored, and the second image is set as an associated image of the first image ⟶ 202

METHOD FOR PROCESSING IMAGE AND APPARATUS THEREOF

The present application claims the priority to Chinese Patent Application No. 201310293601.1, entitled as "METHOD FOR PROCESSING IMAGE AND APPARATUS THEREOF", filed on Jul. 12, 2013 with State Intellectual Property Office of People's Republic of China, which is incorporated herein by reference in its entirety.

FIELD

The present disclosure relates to the field of communications and in particular to a method for processing an image and an apparatus thereof.

BACKGROUND

People may take images of their surrounding persons or objects using electronic devices at any time due to the development of the electronic devices. In order to make it possible to share in real-time their dynamic conditions with their friends, it has also become popular for people to upload their taken images onto the Internet.

However at present the electronic devices taking the images generate relatively large image files and thus fail to perform some convenient and rapid processes on the images and even a corresponding normal process on the images. For example, an image may be opened very slowly because the image is too large; and in another example, an image file may not be uploaded rapidly onto the Internet because the image file is too large, and the image file to be uploaded may even fail to be uploaded in the case where there is a poor network condition because the image file is too large, thus failing to satisfy a demand of a user for real-time uploading of his or her photo.

SUMMARY

In view of this, the disclosure provides a method for processing an image and an apparatus thereof so as to improve the convenience and efficiency of processing a generated image in an electronic device.

In order to attain the foregoing object, the disclosure provides the following technical solutions including a method for processing an image, applicable to an electronic device including an image acquisition unit corresponding to an image acquisition area, the method including:

generating a first image and a second image according to an object to be acquired in the image acquisition area at a first instance of time, wherein both the first image and the second image are images corresponding to the object to be acquired, and the amount of data of the first image is larger than the amount of data of the second image; and storing the first image and the second image and setting the second image as an associated image of the first image.

Optionally the amounts of data of the first image and the second image are determined by display parameters of the first image and the second image, wherein the display parameters include one or more of resolution of an image and pixel depth of an image; and the amount of data of the first image being larger than the amount of data of the second image includes one or more of:

the resolution of the first image being higher than the resolution of the second image; and the image color depth of the first image being larger than the image color depth of the second image.

Optionally generating a first image and a second image according to an object to be acquired in the image acquisition area at a first instance of time includes:

taking images respectively in a first imaging mode and a second imaging mode for the object to be acquired in the image acquisition area at the first instance of time to obtain the first image corresponding to the first imaging mode and the second image corresponding to the second imaging mode, wherein the first imaging mode is different from the second imaging mode.

Optionally taking images respectively in a first imaging mode and a second imaging mode for the object to be acquired in the image acquisition area at the first instance of time to obtain the first image corresponding to the first imaging mode and the second image corresponding to the second imaging mode includes:

acquiring data of a plurality of pixels of the object to be acquired, and generating the first image from data of a first number of pixels among the data of the plurality of pixels, and generating the second image from data of a second number of pixels among the data of the plurality of pixels, wherein the first number is larger than the second number; or taking an image of the object to be acquired by using a third number of sensing elements in the image acquisition unit to obtain the first image, and taking an image of the object to be acquired by using a fourth number of sensing elements in the image acquisition unit to obtain the second image, wherein the third number is larger than the fourth number; or taking an image of the object to be acquired in the image acquisition area at the first instance of time by using a first image acquisition unit with a first pixel to obtain the first image at a first resolution, and taking an image of the object to be acquired in the image acquisition area at the first instance of time by using a second image acquisition unit with a second pixel to obtain the second mage at a second resolution, wherein the first resolution is higher than the second resolution.

Optionally the generating a first image and a second image according to an object to be acquired in the image acquisition area at a first instance of time includes:

taking an image of the object to be acquired in the image acquisition area at the first instance of time to generate the first image, and converting the first image into a second image at a second instance of time, wherein the second instance of time is a point of time after the first instance of time.

Optionally the taking an image of the object to be acquired in the image acquisition area at the first instance of time to generate the first image and converting the first image into a second image at a second instance of time includes one or more of:

taking an image of the object to be acquired in the image acquisition area at the first instance of time to obtain the first image at a first resolution, and processing the first image into the second image at a second resolution, wherein the first resolution is higher than the second resolution; or taking an image of the object to be acquired in the image acquisition area at the first instance of time to obtain the first image at a first image depth, and converting the first image into the second image at a second image depth, wherein the first image depth is larger than the second image depth.

Optionally storing the first image and the second image and setting the second image as an associated image of the first image includes:
storing the first image on the electronic device, and setting the second image as an associated image of the first image and storing the second image into a first server.

Optionally the method further includes:
determining an associated image of the first image and transmitting the associated image to a network device upon reception of an instruction to upload the first image to the network device.

Optionally in the case where the first image is stored on the electronic device and the second image is stored into the first server, transmitting the associated image to the network device includes:
retrieving file data of the second image from the first server and transmitting the retrieved file data of the second image to the network device; or
sending a file transmission instruction message to the first server, wherein the file transmission instruction message instructs the first server to transmit file data of the second image to the network device.

Optionally the method further includes:
deleting the second image in the case where a first predetermined condition is satisfied.

In another aspect, the disclosure provides an apparatus for processing an image, applicable to an electronic device including an image acquisition unit corresponding to an image acquisition area, the apparatus including:
an image generation unit configured to generate a first image and a second image according to an object to be acquired in the image acquisition area at a first instance of time, wherein both the first image and the second image are images corresponding to the object to be acquired, and the amount of data of the first image is larger than the amount of data of the second image; and
an image processing unit configured to store the first image and the second image and to set the second image as an associated image of the first image.

Optionally the amounts of data of the first image and the second image generated by the image generation unit are determined by display parameters of the first image and the second image, wherein the display parameters include one or more of resolution of an image and pixel depth of an image; and
the amount of data of the first image generated by the image generation unit being larger than the amount of data of the second image generated by the image generation unit includes one or more of:
the resolution of the first image being higher than the resolution of the second image; and
the image color depth of the first image being larger than the image color depth of the second image.

Optionally the image generation unit is further configured to take images respectively in a first imaging mode and a second imaging mode for the object to be acquired in the image acquisition area at the first instance of time to obtain the first image corresponding to the first imaging mode and the second image corresponding to the second imaging mode, wherein the first imaging mode is different from the second imaging mode.

Optionally the image generation unit includes:
a first image generation unit is configured to acquire data of a plurality of pixels of the object to be acquired, and to generate the first image from data of a first number of pixels among the data of the plurality of pixels, and to generate the second image from data of a second number of pixels among the data of the plurality of pixels, wherein the first number is larger than the second number; or
a second image generation unit is configured to take an image of the object to be acquired using a third number of sensing elements in the image acquisition unit to obtain the first image, and to take an image of the object to be acquired using a fourth number of sensing elements in the image acquisition unit to obtain the second image, wherein the third number is larger than the fourth number; or
a third image generation unit is configured to take an image of the object to be acquired in the image acquisition area at the first instance of time by using a first image acquisition unit with a first pixel to obtain the first image at a first resolution, and to take an image of the object to be acquired in the image acquisition area at the first instance of time by using a second image acquisition unit with a second pixel to obtain the second mage at a second resolution, wherein the first resolution is higher than the second resolution.

Optionally the image generation unit is further configured to take an image of the object to be acquired in the image acquisition area at the first instance of time to generate the first image, and to convert the first image into a second image at a second instance of time, wherein the second instance of time is a point of time after the first instance of time.

Optionally the image generation unit includes one or more of:
a fourth image generation unit is configured to take an image of the object to be acquired in the image acquisition area at the first instance of time to obtain the first image at a first resolution, and to process the first image into the second image at a second resolution, wherein the first resolution is higher than the second resolution; or
a fifth image generation unit is configured to take an image of the object to be acquired in the image acquisition area at the first instance of time to obtain the first image at a first image depth, and to convert the first image into the second image at a second image depth, wherein the first image depth is larger than the second image depth.

Optionally the image processing unit is further configured to store the first image on the electronic device and to set the second image as an associated image of the first image and to store the second image into a first server.

Optionally the apparatus further includes:
an image transmission unit configured to determine an associated image of the first image and transmit the associated image to a network device upon reception of an instruction to upload the first image to the network device.

Optionally in the case where the image processing unit stores the first image on the electronic device and stores the second image into the first server, the image transmission unit includes:
a first image transmission unit configured to retrieve file data of the second image, which is the associated image of the first image, from the first server and to transmit the retrieved file data of the second image to the network device upon reception of the instruction to upload the first image to the network device; or a second image transmission unit configured to send a file transmission instruction message to the first server upon reception of the instruction to upload the first image to the network device, wherein the file transmission instruction message instructs the first server to transmit file data of the second image to the network device.

Optionally the apparatus further includes:

an image deletion unit configured to delete the second image in the case where a first predetermined condition is satisfied.

As may be apparent from the foregoing technical solutions, in comparison with the conventional technology, the disclosure discloses a method for processing an image and an apparatus thereof, where the first image and the second image of different amounts of data are generated from the object to be acquired in the image acquisition area at the first instance of time, and both of these two images are images corresponding to the object to be acquired. The second image will further be set as an associated image of the first image while these two images are being stored, so that the relationship between the first image and the second image may be obtained and further an image of a corresponding amount of data may be selected as needed for processing in subsequent processing of or operations on the image, to thereby improve the convenience and efficiency of processing the image.

BRIEF DESCRIPTION OF THE DRAWINGS

In order to describe more clearly the technical solutions in the embodiments of the disclosure or in the conventional technology, the drawings to be used in the description of the embodiments or the conventional technology will be described briefly, and obviously the drawings in the following description are illustrative of only some embodiments of the disclosure, and those ordinarily skilled in the art may derive from these drawings other drawings without any inventive effort. In the drawings.

DETAILED DESCRIPTION

The technical solutions in the embodiments of the disclosure will be described below clearly and fully with reference to the drawings in the embodiments of the disclosure, and apparently the described embodiments are only a part but not all of the embodiments of the disclosure. Based upon the embodiments of the disclosure, all the other embodiments derived by those ordinarily skilled in the art without any inventive effort shall come into the scope of the disclosure.

An embodiment of the disclosure discloses a method for processing an image so as to make it possible to perform operations on an image more rapidly and conveniently after the image is generated for the same acquisition object at the same instance of time.

Figure 1:
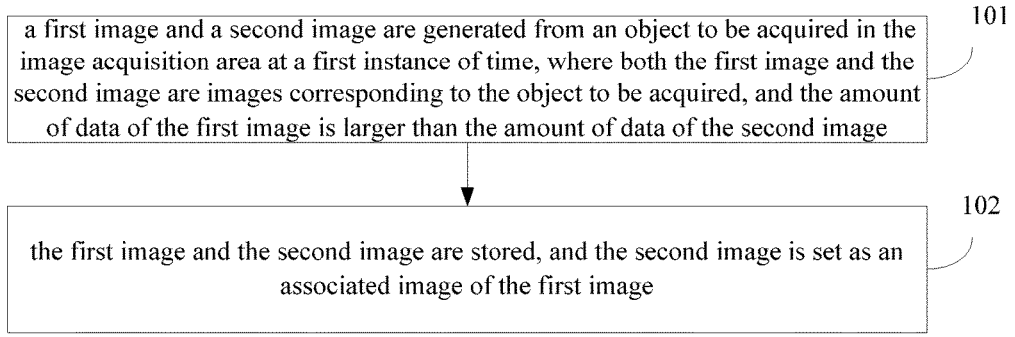
FIG. 1 illustrates a schematic flow chart of an embodiment of a method for processing an image according to the disclosure.

Referring to FIG. 1, there is illustrated a schematic flow chart of an embodiment of a method for processing an image according to the disclosure, and the method of this embodiment may be applicable to a handset, a PAD, a palm computer, a notebook computer or another electronic device, which includes an image acquisition unit corresponding to an image acquisition area, and the method for this embodiment may include:

Step 101: A first image and a second image are generated according to an object to be acquired in the image acquisition area at a first instance of time.

Both the first image and the second image are images corresponding to the object to be acquired, and the amount of data of the first image is larger than the amount of data of the second image. That is, the first image and the second image include the same image contents, but differently, the amount of data of the first image is different from that of the second image, and correspondingly a storage space occupied for storage of the first image is different from that of the second image, where the data amounts of the first image and the second image may also be appreciated as the data amount of an image file of the first image and the data amount of an image file of the second image.

The image acquisition unit of the electronic device may be appreciated as a camera of the electronic device or an apparatus including at least an image sensor, the image acquisition unit corresponds to an image acquisition area, and a scene coming into the image acquisition area is the object to be acquired. Generally a preview image may be presented in a preview area on a screen of the electronic device before an image of the object to be acquired in the image acquisition area is taken.

In the embodiment of this application, for an object to be acquired in the image acquisition area at the same instance of time, two images, both of which include the object to be acquired but for which different amounts of data are occupied, may be generated. An instance of time when the object to be acquired is presented in the image acquisition area is referred to as a first instance of time so as to indicate that the object to be acquired included in the two images is an object presented in the image acquisition area at the same instance of time.

It shall be noted that instances of time when the first image and the second image are generated may be the same or may be different in a practical application.

Step 102: The first image and the second image are stored, and the second image is set as an associated image of the first image.

In this application, the second image further needs to be set as an associated image of the first image in addition to storage of the first image and the second image.

For example, it is possible that there is an association relationship between the first image and the second image and information about the association relationship is stored. It is indicated in the information about the association relationship that both the first image and the second image include the same image contents and the amount of data occupied by the first image is larger than the amount of data occupied by the second image so that one of these two images which satisfies a current processing requirement may be selected according to the association relationship in subsequent processing of either of the two images.

In another example, the association relationship between the second image and the first image may be identified by specific identifier information.

In this embodiment, the first image and the second image of different amounts of data are generated according to the object to be acquired in the image acquisition area at a first instance of time, and both of these two images are images corresponding to the object to be acquired. The second image will further be set as an associated image of the first image while these two images are being stored, so that the relationship between the first image and the second image may be obtained more conveniently and further an image of a corresponding amount of data may be selected as needed for processing in subsequent processing of or operations on the image, to thereby improve the convenience and efficiency of processing the image while making it possible to improve the reliability of processing the image.

In any embodiment of this application, the amount of data of the first image is different from that of the second image, which may be determined by display parameters of the first image and the second image. The display parameters may include one or more of resolutions of the images, pixel depths of the images and other parameters.

Generally the higher the resolution of an image is, the larger the amount of data of the image will be, so the amount of data of the first image being larger than the amount of data of the second image may be the resolution of the first image being higher than the resolution of the second image.

Correspondingly given other identical or similar parameters of an image, the larger the pixel depth of the image is, the larger a space occupied for storage of the image will be, namely, the greater the amount of data of the image will be. Thus the amount of data of the first image being larger than the amount of data of the second image may be the image color depth of the first image being larger than the image color depth of the second image, where the image color depth refers to the number of bits to evaluate information stored per pixel, which relates to the fineness of a single pixel (point) itself. The unit of the image color depth is in bits, and which is also a parameter to evaluate the fineness/roughness of an image. For example, the amount of data of a black and white image is smaller than the amount of data of a color image including the same image contents, and the image color depth of the black and white image is larger than the image color depth of the color image. For example, a monochromatic image is also a black and white image with an image depth of 8 bits; and for a color image composed of three primary colors RGB, if the number of pixels in the three components respectively are 4, 4 and 4, then the pixel depth of the image is 12 bits.

Of course the amount of data of the first image being larger than the amount of data of the second image may be the resolution of the first image being higher than the resolution of the second image and the image depth of the first image being larger than the image depth of the second image.

Figure 2:
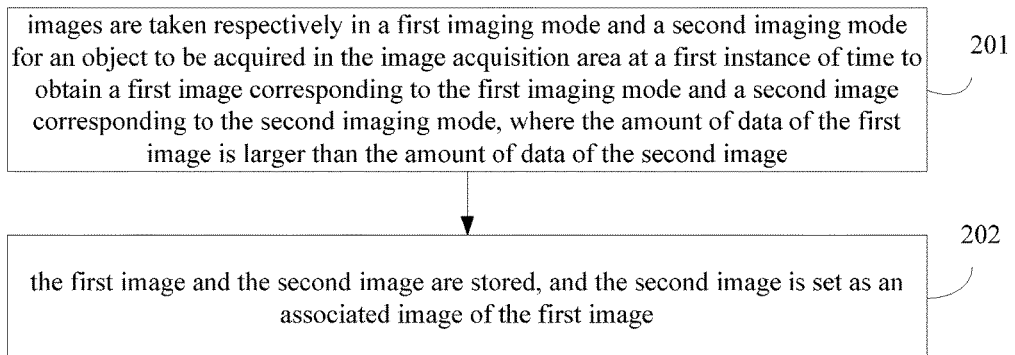
FIG. 2 illustrates a schematic flow chart of another embodiment of a method for processing an image according to the disclosure.

Referring to FIG. 2, there is illustrated a schematic flow chart of another embodiment of a method for processing an image according to the disclosure, and the method for this embodiment may be applicable to a handset, a PAD, a notebook computer or another electronic device, which includes an image acquisition unit corresponding to an image acquisition area, and the method for this embodiment may include:

Step 201: Images are taken respectively in a first imaging mode and a second imaging mode for an object to be acquired in the image acquisition area at a first instance of time to obtain a first image corresponding to the first imaging mode and a second image corresponding to the second imaging mode.

Both the first image and the second image are images corresponding to the object to be acquired, and the amount of data of the first image is larger than the amount of data of the second image, and the amount of data of the first image is different from that of the second image, which may be determined by any of the parameter described in the foregoing embodiment. The first imaging mode is an image generation mode different from the second imaging mode.

Step 202: The first image and the second image are stored, and the second image is set as an associated image of the first image.

This step is similar to the operation process in the embodiment illustrated in FIG. 1, and a repeated description thereof will be omitted here.

In the embodiment, images are taken in two different imaging modes at the first instance of time for the object to be acquired in the image acquisition area at that instance of time to thereby obtain the first image and the second image. That is, in this embodiment, the first image and the second image are generated in different modes, but the first image and the second image are generated at the same instance of time.

Since the amount of data of the first image may be different from that of the second image due to numerous reasons, correspondingly there may also be numerous possible implementations corresponding to the first imaging mode and the second imaging mode.

In order to make the resolution of the first image different from that of the second image and thus to make the amount of data of the first image different from that of the second image, in one possible implementation, data of a plurality of pixels of the object to be acquired in the image acquisition area is acquired, and the first image is generated from data of a first number of pixels among the data of the plurality of pixels, and the second image is generated from data of a second number of pixels among the data of the plurality of pixels, where the first number is larger than the second number, and since the first image is generated from a larger number of pixels, the resolution of the first image is higher than the resolution of the second image, so that the amount of data of the first image is larger than the amount of data of the second image.

In order to make the resolution of the first image different from that of the second image and thus to make the amount of data of the first image different from that of the second image, in another possible implementation, an image is taken of the object to be acquired using a third number of sensing elements in the image acquisition unit to obtain the first image, and an image is taken of the object to be acquired using a fourth number of sensing elements in the image acquisition unit to obtain the second image, where the third number is larger than the fourth number. In this implementation, the images at different resolutions may be obtained by controlling the number of sensing elements operating in the image sensor in the image acquisition unit.

In order to make the resolution of the first image different from that of the second image and thus to make the amount of data of the first image different from that of the second image, in another possible implementation, an image is taken of the object to be acquired in the image acquisition area at the first instance of time by using a first image acquisition unit with a first pixel to obtain the first image at a first resolution, and an image is taken of the object to be acquired in the image acquisition area at the first instance of time by using a second image acquisition unit with a second pixel to obtain the second mage at a second resolution, where the first resolution is higher than the second resolution.

In this implementation, two image acquisition units with different pixels may be arranged on the electronic device, and these two image acquisition units acquire images in the same area, that is, both of these two image acquisition units correspond to one image acquisition area, and thus the same image contents may be previewed by these two image acquisition units in an image preview. Images are taken respectively by using these two image acquisition units at a first instance of time for the object to be acquired in the image acquisition area at that instance of time. These two image acquisition units acquire the object to be acquired in the same acquisition area at the same instance of time, so both of the images generated by these two image acquisition units are images corresponding to the object to be acquired, but these two image acquisition units are provided with different pixels, so the resolution of the generated first image is different from that of the generated second image, where the resolution of the first image is higher than the resolution of the second image.

In order to make the image color depth of the first image different from that of the second image, two image acquisition units generating images at different image color depths may also be arranged on the electronic device, for example, a black and white image camera and a color image camera. Alternatively two image acquisition units may be arranged, and these two image acquisition units may be set with different parameters so that these two image acquisition units may acquire images at different image color depth.

Figure 3:
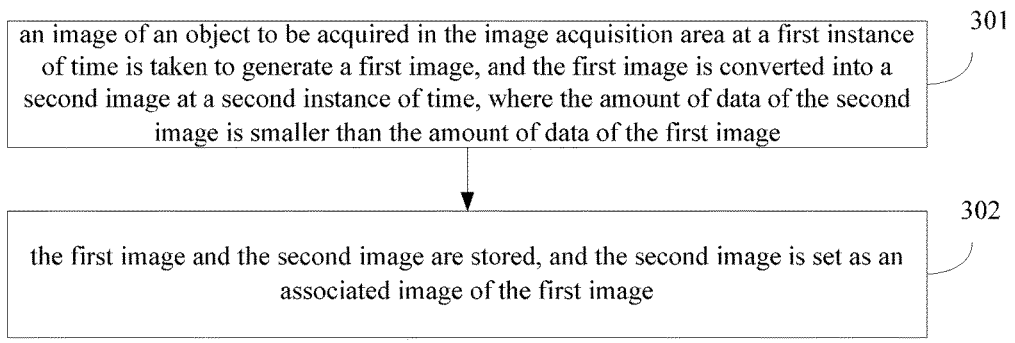
FIG. 3 illustrates a schematic flow chart of another embodiment of a method for processing an image according to the disclosure.

Referring to FIG. 3, there is illustrated a schematic flow chart of another embodiment of a method for processing an image according to the disclosure, and the method of this embodiment may be applicable to a handset, a PAD, a notebook computer or another electronic device, which includes an image acquisition unit corresponding to an image acquisition area, and the method of this embodiment may include:

Step 301: An image of an object to be acquired in the image acquisition area at a first instance of time is taken to generate a first image, and the first image is converted into a second image at a second instance of time.

Here, the amount of data of the second image is smaller than the amount of data of the first image.

The second instance of time is a point of time after the first instance of time.

In this embodiment, an image of the object to be acquired in the image acquisition area at the first instance of time is taken when an image taking condition is satisfied to generate the first image. After the first image is obtained, the first image will be further converted into the second image, the amount of data of which is smaller than that of the first image. The instance of time when the second image is generated is later than the instance of time when the first image is generated.

In this embodiment, the reason caused the amount of data of the first image being larger than the amount of data of the second image may be that the resolution of the first image is higher than the resolution of the second image and/or the image color depth of the first image is larger the image color depth of the second image.

In corresponding to several scenarios resulting in different amounts of data, the first image may also be converted into the second image in numerous implementations. In one possible implementation, after an image is taken of the object to be acquired in the image acquisition area at the first instance of time to obtain the first image at a first resolution, the first image is processed into the second image at a second resolution, where the first resolution is higher than the second resolution. The first image may be processed into the second image at a lower resolution by the way of image compression or the like in the conventional technology capable of lowering the resolution of the image, which will not be limited in the disclosure.

In another possible implementation, after an image is taken of the object to be acquired in the image acquisition area at the first instance of time to obtain the first image at a first image depth, the first image is converted into the second image at a second image depth, where the image depth of the first image is larger than that of the second image. The image acquisition unit acquires the object to be acquired in the image acquisition area to generate the first image, and in order to lower the image depth of the first image, the first image may be converted into the second image at a lower image depth, where conversion of the first image into the second image at a lower image depth may be performed anyway as in the conventional technology. For example, in the case where the first image is a color image, the second image may be a black and white image, and the color image may be converted into the black and white image anyway in the conventional technology capable of converting a color image into a black and white image.

Step 302: The first image and the second image are stored, and the second image is set as an associated image of the first image.

This step is similar to the process described in the corresponding step of the foregoing embodiment, and a repeated description thereof will be omitted here.

In this embodiment, after an image is taken of the object to be acquired in the image acquisition area at the first instance of time to generate the first image, the system will trigger the first image to be converted into the second image of smaller amount of data. Thus the two images of different amounts of data but including the same image contents may be obtained so that a change in image format may be triggered for a desirable image of a different amount of data without any manual operation by a user. In the meanwhile, the first image and the second image are stored, and the second image is set as an associated image of the first image so that one of the associated images may be selected as an image to be processed in subsequent processing of the image to thereby improve the speed of processing.

As can be appreciated, in order to avoid the electronic device from storing a plurality of images for the same image contents and consequently occupying a significant storage space of the electronic device, optionally in any of the foregoing embodiments, the first image may be stored on the electronic device, and the second image may be stored into a designated first server as an associated image of the first image. That is, the second image may be stored in a server providing a storage space in a network, that is, the second image may be stored to a cloud as commonly referred to.

Furthermore in any of the foregoing embodiments, after the first image and the second image are stored and the second image is set as an associated image of the first image, different processes on the first image and the second image may be performed dependent upon different application scenarios. For example, in the case where an instruction to present the first image is received, a load condition may be determined from operating statuses of respective applications in the electronic devices, and the first image or the second image may be selected to be opened dependent upon the load condition to thereby improve the speed at which the image is presented. For example if there is a high CPU utilization ratio at the current instance of time or there are a large number of images currently presented by a browser, and thus there is a high load of the electronic device, then the second image of a lower amount of data may be selected; and if there is a low load in the electronic device at the current instance of time, then the first image may be presented directly to thereby improve the presentation effect of the presented image. Of course in the case where an instruction to present the first image or the second image is received, prompt information may also be shown to let the user choose to present the first image of a larger amount of data or the second image of a smaller amount of data, and the image may be presented as selected by the user.

Figure 4:
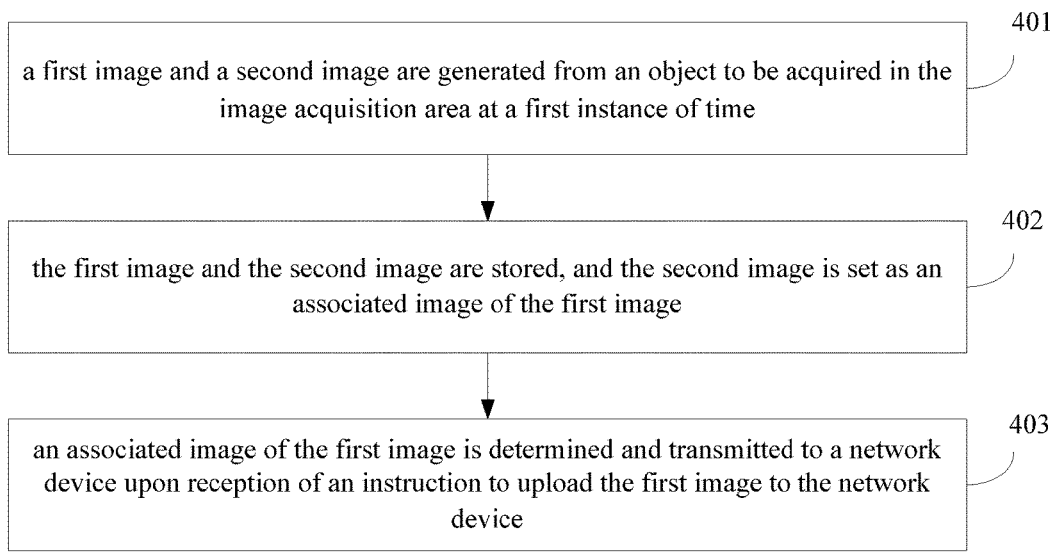
FIG. 4 illustrates a schematic flow chart of another embodiment of a method for processing an image according to the disclosure.

The first image and the second image may also be processed by uploading the first image or the second image to a network device. Specifically, referring to FIG. 4, there is illustrated a schematic flow chart of another embodiment of a method for processing an image according to the disclosure, and the method of this embodiment may be applicable to a handset, a PAD, a notebook computer or another electronic device, which includes an image acquisition unit corresponding to an image acquisition area, and the method of this embodiment may include:

Step 401: A first image and a second image are generated from an object to be acquired in the image acquisition area at a first instance of time.

Both the first image and the second image are images corresponding to the object to be acquired, and the amount of data of the first image is larger than the amount of data of the second image.

Step 402: The first image and the second image are stored, and the second image is set as an associated image of the first image.

The operation processes of the step 401 and the step 402 are similar to the operation processes of the corresponding step in any of the foregoing embodiments, and a repeated description thereof will be omitted here.

Step 403. An associated image of the first image is determined and transmitted to a network device upon reception of an instruction to upload the first image to the network device.

In this embodiment, if the instruction to upload the first image to the network device, a relationship between the first image and the second image may be determined, and further an associated image of the first image, i.e., the second image, may be selected as an image to be transmitted, and the second image may be transmitted to the network device, and since the amount of data of the second image is lower, the amount of transmitted data may be lowered, and the speed of transmitting the image may be improved.

In the case where the first image is stored on the electronic device and the second image is stored into a first server, an associated image of the first image may be transmitted to the network device in the following two implementations after the associated image is determined:

In one implementation, file data of the second image is retrieved from the first server, and the retrieved file data of the second image is transmitted to the network device. In this implementation, the file data of the second image needs to be firstly downloaded into the electronic device, and then the file data of the second image is further transmitted by the electronic device to the network device.

In order to avoid a too large amount of exchanged data resulted by firstly downloading the file data of the second image into the electronic device and then transmitting the same to the network device, in another possible implementation, a file transmission instruction message is sent to the first server, where the file transmission instruction message instructs the first server to transmit the file data of the second image to the network device. In this implementation, the file data of the second image stored in the first server is transmitted directly to the network device without passing the file data of the second image through the electronic device to thereby lower the amount of exchanged data.

As can be appreciated, in the case where the second image is stored on the electronic device; or although the second image is stored in the first server, but the identifier of the second image may be stored on the electronic device to indicate that there is stored the second image which may be operated on, the user may alternatively instruct the electronic device by a designated operation to transmit the second image to a specific network device. The second image may be transmitted directly to the network device upon reception of an instruction to transmit the second image to the network device.

Optionally in any of the foregoing embodiments, the second image may be further deleted in the case where a first predetermined condition is satisfied. The first predetermined condition may be set as needed in practice. For example, the second image is generated for the purpose of improving the speed of uploading the image, and then the second image may be deleted in the case where no request to upload the first image has been received for a designated period of time to thereby lower a space occupied for storage of the second image. Alternatively the stored second image may be deleted after the second image is transmitted to the network device. In another example, the second image may be deleted along with the first image upon reception of an instruction to delete the first image.

Figure 5:
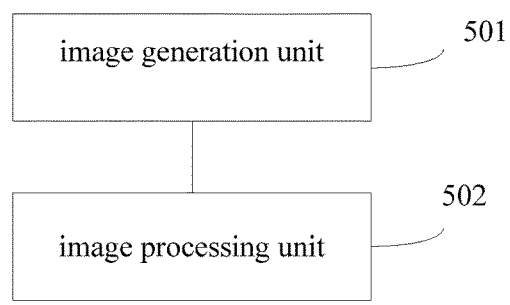
FIG. 5 illustrates a schematic structural diagram of an embodiment of an apparatus processing an image according to the disclosure.

Furthermore the disclosure further provides an apparatus for processing an image, and referring to FIG. 5, there is illustrated a schematic structural diagram of an embodiment of an apparatus for processing an image according to the disclosure, and the apparatus of this embodiment may be applicable to an electronic device including an image acquisition unit corresponding to an image acquisition area, and the apparatus of this embodiment may include:

An image generation unit 501 is configured to generate a first image and a second image from an object to be acquired in the image acquisition area at a first instance of time, where both the first image and the second image are images corresponding to the object to be acquired, and the amount of data of the first image is larger than the amount of data of the second image.

An image processing unit 502 is configured to store the first image and the second image and to set the second image as an associated image of the first image.

The second image may be set as an associated image of the first image in numerous implementations. For example, it is possible that there is an association relationship between the first image and the second image and information about the association relationship is stored. It is indicated in the information about the association relationship that both the first image and the second image include the same image contents and the amount of data occupied by the first image is larger than the amount of data occupied by the second image so that one of these two images to satisfy a current processing demand may be selected according to the association relationship in subsequent processing of either of the two images.

In another example, the association relationship between the second image and the first image may be identified by specific identifier information.

In this embodiment, the first image and the second image of different amounts of data are generated according to the object to be acquired in the image acquisition area at the first instance of time, and both of these two images are images corresponding to the object to be acquired. The second image will further be set as an associated image of the first image while these two images are being stored, so that the relationship between the first image and the second image may be obtained more conveniently and further an image of a corresponding amount of data may be selected as needed for processing in subsequent processing of or operations on the image, to thereby improve the convenience and reliability of processing the image.

The image processing unit is further configured to store the first image on the electronic device and to set the second image as an associated image of the first image and store the second image into a first server.

In the foregoing embodiment, the amounts of data of the first image and the second image generated by the image generation unit are determined by display parameters of the first image and the second image, where the display parameters include one or more of resolutions of the images and pixel depths of the images.

Correspondingly the amount of data of the first image generated by the image generation unit being larger than the amount of data of the second image generated by the image generation unit includes one or more of:

The resolution of the first image being higher than the resolution of the second image; and The image color depth of the first image being larger than the image color depth of the second image.

The image generation unit may generate the first image and the second image concurrently or may generate the two images sequentially. Correspondingly the image generation unit may generate the first image and the second image in numerous implementations.

In correspondence to one implementation of generating the first image and the second image, the image generation unit is further configured to take images respectively in a first imaging mode and a second imaging mode for the object to be acquired in the image acquisition area at the first instance of time to obtain the first image corresponding to the first imaging mode and the second image corresponding to the second imaging mode, where the first imaging mode is different from the second imaging mode.

The image generation unit may include:

A first image generation unit is configured to acquire data of a plurality of pixels of the object to be acquired, and to generate the first image from data of a first number of pixels among the data of the plurality of pixels, and generate the second image from data of a second number of pixels among the data of the plurality of pixels, where the first number is larger than the second number; or A second image generation unit is configured to take an image of the object to be acquired using a third number of sensing elements in the image acquisition unit to obtain the first image, and to take an image of the object to be acquired using a fourth number of sensing elements in the image acquisition unit to obtain the second image, where the third number is larger than the fourth number; or A third image generation unit is configured to take an image of the object to be acquired in the image acquisition area at the first instance of time by using a first image acquisition unit with a first pixel to obtain the first image at a first resolution, and to take an image of the object to be acquired in the image acquisition area at the first instance of time by using a second image acquisition unit with a second pixel to obtain the second mage at a second resolution, where the first resolution is higher than the second resolution.

In correspondence to another implementation of generating the images by the image generation unit, the image generation unit is further configured to take an image of the object to be acquired in the image acquisition area at the first instance of time to generate the first image, and to convert the first image into a second image at a second instance of time, where the second instance of time is a point of time after the first instance of time.

Specifically the image generation unit may include one or more of:

A fourth image generation unit is configured to take an image of the object to be acquired in the image acquisition area at the first instance of time to obtain the first image at a first resolution, and to process the first image into the second image at a second resolution, where the first resolution is higher than the second resolution; or A fifth image generation unit is configured to take an image of the object to be acquired in the image acquisition area at the first instance of time to obtain the first image at a first image depth, and to convert the first image into the second image at a second image depth, where the image depth of the first image is larger than image depth of the second image.

Figure 6:
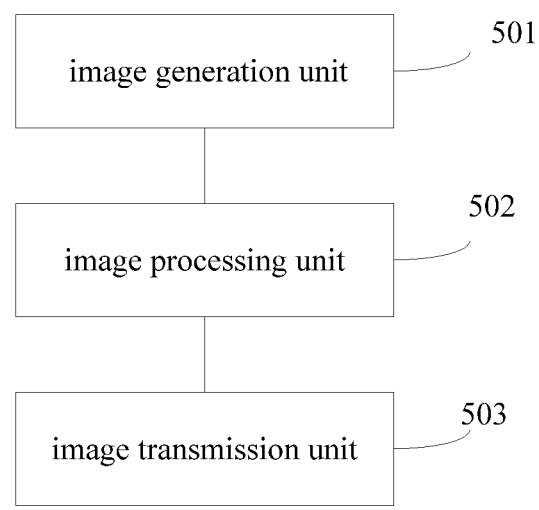
FIG. 6 illustrates a schematic structural diagram of another embodiment of an apparatus processing an image according to the disclosure.

Referring to FIG. 6, there is illustrated a schematic structural diagram of another embodiment of an apparatus for processing an image according to the disclosure, and the apparatus of this embodiment may be applicable to an electronic device including an image acquisition unit corresponding to an image acquisition area, and the apparatus of this embodiment is different from the apparatus of the foregoing embodiment in that:

The apparatus of this embodiment further includes:

An image transmission unit 503 is configured to determine an associated image of the first image and to transmit the associated image to a network device upon reception of an instruction to upload the first image to the network device.

Optionally in the case where the image processing unit stores the first image on the electronic device and stores the second image into the first server, the image transmission unit 503 includes:

A first image transmission unit is configured to retrieve file data of the second image, which is the associated image of the first image, from the first server and to transmit the retrieved file data of the second image to the network device upon reception of the instruction to upload the first image to the network device; or A second image transmission unit is configured to send a file transmission instruction message to the first server upon reception of the instruction to upload the first image to the network device, where the file transmission instruction message instructs the first server to transmit file data of the second image to the network device.

Furthermore in any of the foregoing embodiments, the apparatus may further include an image deletion unit configured to delete the second image in the case where a first predetermined condition is satisfied. Specifically the first predetermined condition may be that the second image is deleted along with the first image upon reception of an instruction to delete the first image; or the second image is deleted in the case where no instruction to upload the first image has been received for a designated period of time after the first image and the second image are stored; or the second image is deleted after the second image is transmitted to the network device.

The respective embodiments have been described progressively in this description, and each of the embodiments has been focused upon its differences from the other embodiments, so reference may be made to each other for those identical or similar points among the respective embodiments. For the apparatus disclosed according to an embodiment, it corresponds to its method disclosed according to an embodiment, so the description thereof has been simplified, and reference may be made to the relevant disclosure of the method for their relevant points.

The foregoing description of the disclosed embodiments enables those skilled in the art to make or use the disclosure. Numerous modifications to these embodiments will be obvious to those skilled in the art, and the general principle as defined in this description may be put into practice in other embodiments without departing from the spirit and scope of the disclosure. Accordingly the disclosure will not be limited to these embodiments disclosed in this description but shall be accorded the broadcast scope consistent with the principle and novel characteristics disclosed in this description.

The invention claimed is:

1. A method for processing an image, applicable to an electronic device including an image acquisition unit corresponding to an image acquisition area, wherein the method comprises:
   generating a first image and a second image according to an object to be acquired in the image acquisition area at a first instance of time, wherein both the first image and the second image are images corresponding to the object to be acquired, and an amount of data of the first image is larger than an amount of data of the second image; and
   storing the first image and the second image and setting the second image as an associated image of the first image;
   wherein generating the first image and the second image according to the object to be acquired in the image acquisition area at the first instance of time comprises:
   taking images respectively in a first imaging mode and a second imaging mode for the object to be acquired in the image acquisition area at the first instance of time to obtain the first image corresponding to the first imaging mode and the second image corresponding to the second imaging mode, wherein the first imaging mode is different from the second imaging mode;
   wherein taking images respectively in a first imaging mode and a second imaging mode for the object to be acquired in the image acquisition area at the first instance of time to obtain the first image corresponding to the first imaging mode and the second image corresponding to the second imaging mode comprises:
   taking an image of the object to be acquired by using a first number of sensing elements in the image acquisition unit to obtain the first image, and taking an image of the object to be acquired by using a second number of sensing elements in the image acquisition unit to obtain the second image, wherein the first number is larger than the second number; or
   taking an image of the object to be acquired in the image acquisition area at the first instance of time by using a first image acquisition unit with a first pixel to obtain the first image at a first resolution, and taking an image of the object to be acquired in the image acquisition area at the first instance of time by using a second image acquisition unit with a second pixel to obtain the second image at a second resolution, wherein the first resolution is higher than the second resolution.

2. The method according to claim 1, wherein the amounts of data of the first image and the second image are determined by display parameters of the first image and the second image, wherein the display parameters comprise one or more of resolution of an image and pixel depth of an image; and
   the amount of data of the first image being larger than the amount of data of the second image comprises one or more of:
   the resolution of the first image being higher than the resolution of the second image; and
   the pixel depth of the first image being larger than the pixel depth of the second image.

3. The method according to claim 1, wherein storing the first image and the second image and setting the second image as an associated image of the first image comprises:
   storing the first image on the electronic device, and setting the second image as an associated image of the first image and storing the second image into a first server.

4. The method according to claim 3, further comprising:
   determining an associated image of the first image and transmitting the associated image to a network device upon reception of an instruction to upload the first image to the network device.

5. The method according to claim 4, wherein in the case where the first image is stored on the electronic device and the second image is stored into the first server, transmitting the associated image to the network device comprises:
   retrieving file data of the second image from the first server and transmitting the retrieved file data of the second image to the network device; or
   sending a file transmission instruction message to the first server, wherein the file transmission instruction message instructs the first server to transmit file data of the second image to the network device.

6. The method according to claim 1, further comprising:
   deleting the second image in the case where a first predetermined condition is satisfied.

7. An apparatus for processing an image, applicable to an electronic device including an image acquisition unit corresponding to an image acquisition area, wherein the apparatus comprises:
   an image generation unit configured to generate a first image and a second image according to an object to be acquired in the image acquisition area at a first instance of time, wherein both the first image and the second image are images corresponding to the object to be acquired, and an amount of data of the first image is larger than an amount of data of the second image; and
   an image processing unit configured to store the first image and the second image and to set the second image as an associated image of the first image;
   wherein the image generation unit is further configured to take images respectively in a first imaging mode and a second imaging mode for the object to be acquired in the image acquisition area at the first instance of time to obtain the first image corresponding to the first imaging mode and the second image corresponding to the second imaging mode, wherein the first imaging mode is different from the second imaging mode;

wherein the image generation unit comprises:
a second image generation unit configured to take an image of the object to be acquired by using a first number of sensing elements in the image acquisition unit to obtain the first image, and to take an image of the object to be acquired by using a second number of sensing elements in the image acquisition unit to obtain the second image, wherein the first number is larger than the second number; or a third image generation unit configured to take an image of the object to be acquired in the image acquisition area at the first instance of time by using a first image acquisition unit with a first pixel to obtain the first image at a first resolution, and to take an image of the object to be acquired in the image acquisition area at the first instance of time by using a second image acquisition unit with a second pixel to obtain the second image at a second resolution, wherein the first resolution is higher than the second resolution.

8. The apparatus according to claim 7, wherein the amounts of data of the first image and the second image generated by the image generation unit are determined by display parameters of the first image and the second image, wherein the display parameters comprise one or more of resolution of an image and pixel depths of an image; and the amount of data of the first image generated by the image generation unit being larger than the amount of data of the second image generated by the image generation unit comprises one or more of:

the resolution of the first image being higher than the resolution of the second image; and the pixel depth of the first image being larger than the pixel depth of the second image.

9. The apparatus according to claim 7, wherein the image processing unit is further configured to store the first image on the electronic device and to set the second image as an associated image of the first image and to store the second image into a first server.

10. The apparatus according to claim 7, further comprising:

an image transmission unit configured to determine an associated image of the first image and to transmit the associated image to a network device upon reception of an instruction to upload the first image to the network device.

11. The apparatus according to claim 10, wherein in the case where the image processing unit stores the first image on the electronic device and stores the second image into a first server, the image transmission unit comprises:

a first image transmission unit configured to retrieve file data of the second image, which is the associated image of the first image, from the first server and to transmit the retrieved file data of the second image to the network device upon reception of the instruction to upload the first image to the network device; or a second image transmission unit configured to send a file transmission instruction message to the first server upon reception of the instruction to upload the first image to the network device, wherein the file transmission instruction message instructs the first server to transmit file data of the second image to the network device.

12. The apparatus according to claim 7, further comprising: an image deletion unit configured to delete the second image in the case where a first predetermined condition is satisfied.

* * * * *